United States Patent
Kim et al.

(10) Patent No.: US 10,381,663 B2
(45) Date of Patent: Aug. 13, 2019

(54) HOLLOW FIBER MEMBRANE CARTRIDGE-TYPE HUMIDIFICATION MODULE AND METHOD FOR MANUFACTURING SAME

(71) Applicant: KOLON INDUSTRIES, INC., Gwacheon-si, Gyeonggi-do (KR)

(72) Inventors: Kyoung Ju Kim, Yongin-si (KR); Young Seok Oh, Yongin-si (KR); Jin Hyung Lee, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 142 days.

(21) Appl. No.: 15/538,345

(22) PCT Filed: Dec. 17, 2015

(86) PCT No.: PCT/KR2015/013869
§ 371 (c)(1),
(2) Date: Jun. 21, 2017

(87) PCT Pub. No.: WO2016/105021
PCT Pub. Date: Jun. 30, 2016

(65) Prior Publication Data
US 2017/0358808 A1    Dec. 14, 2017

(30) Foreign Application Priority Data
Dec. 23, 2014    (KR) .................. 10-2014-0186853

(51) Int. Cl.
*H01M 8/04*     (2016.01)
*H01M 8/04119*  (2016.01)
*H01M 8/1018*   (2016.01)

(52) U.S. Cl.
CPC ......... *H01M 8/04* (2013.01); *H01M 8/04149* (2013.01); *H01M 2008/1095* (2013.01); *Y02P 70/56* (2015.11)

(58) Field of Classification Search
CPC ............... H01M 8/04; H01M 8/04149; H01M 2008/1095; Y02P 70/56
(Continued)

(56) References Cited

U.S. PATENT DOCUMENTS 9,034,528 B2 * 5/2015 Kim ..................... B01D 63/04
                                                     261/102
9,227,160 B2 * 1/2016 Cao ..................... B01D 63/022
(Continued)

FOREIGN PATENT DOCUMENTS

CN    103000919 A    3/2013
JP    3-94928 U      9/1991
(Continued)

OTHER PUBLICATIONS

Japanese Patent Office; Communication dated Aug. 21, 2018 in counterpart application No. 2017-533915.
(Continued)

*Primary Examiner* — Charles S Bushey
(74) *Attorney, Agent, or Firm* — Sughrue Mion, PLLC

(57) ABSTRACT

A hollow fiber membrane cartridge-type humidification module and a method for manufacturing the same are provided. The module includes a housing; commonly used hollow fiber membrane cartridges fitted to both ends of a plurality of hollow fiber membrane bundles, which are inserted into the housing along the longitudinal direction of the housing; a delimitating unit provided inside the housing so as to delimit the plurality of hollow fiber membrane bundles; and a potting unit for potting the plurality of
(Continued)

commonly used hollow fiber membrane cartridges and the hollow fiber membrane bundles in a batch mode.

10 Claims, 7 Drawing Sheets

(58) Field of Classification Search
 USPC .......................................................... 261/104
 See application file for complete search history.

(56) References Cited

U.S. PATENT DOCUMENTS

| | | | | |
|---|---|---|---|---|
| 9,640,814 B2* | 5/2017 | Kim | ................... | H01M 8/04492 |
| 10,166,511 B2* | 1/2019 | Requate | ............... | B01D 63/022 |
| 2002/0024155 A1* | 2/2002 | Kusano | ..................... | F24F 6/04 |
| | | | | 261/104 |
| 2004/0050791 A1* | 3/2004 | Herczeg | ............... | B01D 61/145 |
| | | | | 210/651 |
| 2008/0093752 A1* | 4/2008 | Jeon | ....................... | B01D 63/02 |
| | | | | 261/100 |
| 2008/0217795 A1* | 9/2008 | Gofer | ................ | H01M 8/04141 |
| | | | | 261/104 |
| 2009/0215142 A1* | 8/2009 | Tsai | ....................... | C12M 21/12 |
| | | | | 435/170 |
| 2013/0065140 A1* | 3/2013 | Kim | ....................... | B01D 63/04 |
| | | | | 429/413 |
| 2013/0149634 A1 | 6/2013 | Kim et al. | | |
| 2013/0280767 A1* | 10/2013 | Kobayashi | ............. | B01D 63/02 |
| | | | | 435/115 |

FOREIGN PATENT DOCUMENTS

| | | |
|---|---|---|
| JP | 2010-107069 A | 5/2010 |
| KR | 10-2011-0109814 A | 10/2011 |
| KR | 10-2012-0074507 A | 7/2012 |
| KR | 10-2012-0102988 A | 9/2012 |
| KR | 10-2013-0029306 A | 3/2013 |
| KR | 10-2013-0034404 A | 4/2013 |
| KR | 10-2013-0093666 A | 8/2013 |
| WO | 2014/007138 A1 | 1/2014 |
| WO | 2014171677 A1 | 10/2014 |

OTHER PUBLICATIONS

European Patent Office; Communication dated Jul. 13, 2018 in counterpart application No. 15873548.0.
International Searching Authority, International Search Report of PCT/KR2015/013869 dated Apr. 20, 2016 [PCT/ISA/210].
The State Intellectual Property Office of the P.R.C., Communication dated Feb. 12, 2019, issued in corresponding Chinese Application No. 201580068134.X.

* cited by examiner

HOLLOW FIBER MEMBRANE CARTRIDGE-TYPE HUMIDIFICATION MODULE AND METHOD FOR MANUFACTURING SAME

CROSS REFERENCE TO RELATED APPLICATIONS

This application is a National Stage of International Application No. PCT/KR2015/013869, filed Dec. 17, 2015, claiming priority based on Korean Patent Application No. 10-2014-0186853, filed Dec. 23, 2014, the contents of all of which are incorporated herein by reference in their entirety.

TECHNICAL FIELD

The present invention relates to a hollow fiber membrane cartridge-type humidification module and a method for manufacturing the same, and more particularly, to a hollow fiber membrane cartridge-type humidification module and a method for manufacturing the same in which commonly used hollow fiber membrane cartridges are inserted into and integrated with a housing, whereby products having a greater variety of capacities may be realized, the efficiency of use of the hollow fiber membrane cartridges may be increased, and the manufacturing time and cost may be reduced via simplified potting.

BACKGROUND ART

A fuel cell is an electricity generation cell that generates electricity via a reaction involving hydrogen and oxygen. Such a fuel cell has advantages in that it may continuously generate electricity as long as oxygen and hydrogen are supplied, unlike general chemical cells such as, for example, a battery or a storage battery, and in that it has no thermal loss and is twice as efficient as an internal combustion engine. In addition, the fuel cell entails low emission of pollutants because it directly converts chemical energy produced via the reaction of hydrogen and oxygen into electricity. Accordingly, the fuel cell has advantages in that it is environmentally friendly and is capable of reducing the risk of resource depletion due to increased energy consumption. Fuel cells may be broadly classified, according to the type of electrolyte used therein, into a polymer electrolyte membrane fuel cell (PEMFC), a phosphoric acid fuel cell (PAFC), a molten carbonate fuel cell (MCFC), a solid oxide fuel cell (SOFC), and an alkali fuel cell (AFC), for example. These respective fuel cells basically operate on the same principle, but differ in, for example, the type of fuels used, the operating temperatures thereof, catalysts and electrolytes. Among the aforementioned fuel cells, the polymer electrolyte membrane fuel cell is known to be the most promising in small-scale stationary power generation equipment as well as transportation systems because it operates at a lower temperature than other fuel cells and may be reduced in size owing to a large output density thereof.

One of the most important factors to improve the performance of the polymer electrolyte membrane fuel cell is to allow a polymer electrolyte membrane or a proton exchange membrane (PEM) of a membrane-electrode assembly (MEA) to maintain a constant percentage of moisture content by supplying at least predetermined amount of moisture thereto. This is because electricity generation efficiency is rapidly deteriorated when the polymer electrolyte membrane is dried. Examples of methods of humidifying the polymer electrolyte membrane may include a bubbler humidification method of supplying moisture by passing a subject gas via a diffuser after a pressure vessel is filled with water, a direct injection method of calculating the supply amount of moisture required for a fuel cell reaction and directly supplying moisture to a gas flow pipe through a solenoid valve, and a humidification membrane method of supplying moisture to a gas flow layer using a polymer separation membrane. Among these methods, the humidification membrane method of humidifying a polymer electrolyte membrane by supplying water vapor to gas supplied to the polymer electrolyte membrane using a membrane that selectively permeates only water vapor contained in exhaust gas is advantageous in terms of a reduction in weight and size.

The selective permeation membrane used in the humidification membrane method may be a hollow fiber membrane having a large permeation area per unit volume when it forms a module. That is, when a humidifier is manufactured using a hollow fiber membrane, a hollow fiber membrane having a wide contact surface area may be highly integrated, thus realizing sufficient humidification of a fuel cell even for a small volume thereof. In addition, low-cost materials are available, and moisture and heat contained in high-temperature unreacted gas, discharged from the fuel cell, may be collected to thereby be reused via the humidifier.

However, in the case of a conventional hollow fiber membrane module, when a plurality of hollow fiber membranes is integrated in order to increase the capacity of the module, a gas stream moving outward from the hollow fiber membranes may not be uniformly formed due to inconsistent resistance caused by the hollow fiber membranes. A technique of or increasing the capacity by splitting a hollow fiber membrane bundle or forming a unit module in a cartridge shape has been used in order to overcome the problem described above. However, this technique may cause an increase in the manufacturing cost because the time required to manufacture an individual cartridge module is too long, or may increase variation in quality due to poor workability when the bundle is split.

PRIOR ART DOCUMENT

Korean Patent Laid-Open Publication No. 2011-0109814 (Publication Date: 6 Oct. 2011) Korean Patent Laid-Open Publication No. 2012-0074507 (Publication Date: 6 Jul. 2012)
Korean Patent Laid-Open Publication No. 2013-0034404 (Publication Date: 5 Apr. 2013)

DISCLOSURE

Technical Problem

Therefore, the present invention has been made in view of the above problems, and it is one object of the present invention to provide a hollow fiber membrane cartridge-type humidification module and a method for manufacturing the same in which a plurality of commonly used hollow fiber membrane cartridges are inserted into and integrated with a housing, whereby products having a greater variety of capacities may be realized, the efficiency of use of the hollow fiber membrane cartridges may be increased, and the manufacturing time and cost may be reduced via simplified potting.

Technical Solution

In accordance with an aspect of the present invention, the above and other objects can be accomplished by the provision of a hollow fiber membrane cartridge-type humidification module including a housing, commonly used hollow fiber membrane cartridges fitted to both ends of a plurality of hollow fiber membrane bundles, which are inserted into the housing in a longitudinal direction of the housing, a sectioning unit provided inside the housing so as to section the hollow fiber membrane bundles, and a potting portion configured to perform potting of the commonly used hollow fiber membrane cartridges and the hollow fiber membrane bundles into the housing in a batch mode.

The hollow fiber membrane cartridge-type humidification module may further include commonly used empty cartridges provided inside the housing so as to be fitted into the sectioning unit with no hollow fiber membrane bundle and undergo potting into the housing in a batch mode according to a humidification capacity or humidification capability of the humidification module. Each commonly used hollow fiber membrane cartridge may have a fluid passage formed therein to allow a fluid to be easily introduced into the hollow fiber membrane bundle.

The hollow fiber membrane bundle in each commonly used hollow fiber membrane cartridge may include hollow fiber membranes within a range from 30 vol % to 60 vol % of an entire volume thereof.

The housing may have a circular, oval, or polygonal transverse cross-sectional shape.

Each commonly used hollow fiber membrane cartridge may have a circular, oval, or polygonal transverse cross-sectional shape. The hollow fiber membrane bundle in the commonly used hollow fiber membrane cartridge may have a ratio of an equivalent diameter to a length thereof within a range from 1:2 to 1:10.

The commonly used empty cartridges may have a circular, oval or polygonal shape and are closed to prevent a fluid from moving into an insertion space in the sectioning unit.

In accordance with another aspect of the present invention, there is provided a method of manufacturing a hollow fiber membrane cartridge-type humidification module, including preparing commonly used hollow fiber membrane cartridges to be fitted to both ends of hollow fiber membrane bundles, manufacturing a housing having a sectioning unit configured to section the hollow fiber membrane bundles after determining a capacity of the module according to the shape and number of the commonly used hollow fiber membrane cartridges, inserting and arranging the commonly used hollow fiber membrane cartridges and the hollow fiber membrane bundles into the housing, and potting the arranged commonly used hollow fiber membrane cartridges and the arranged hollow fiber membrane bundles into the housing in a batch mode.

In the manufacturing, the sectioning unit may be integrally formed with the housing, or is separately formed and assembled with the housing.

Advantageous Effects

With a hollow fiber membrane cartridge-type humidification module and a method for manufacturing the same according to the present invention, a plurality of commonly used hollow fiber membrane cartridges are inserted into and integrated with a housing, whereby the housing may be manufactured according to the shape and number of commonly used hollow fiber membrane cartridges, which enables the realization of products having a greater variety of capacities, and may increase the efficiency of use of the commonly used hollow fiber membrane cartridges according to the shape and number thereof and the size ratio thereof. In addition, by potting the commonly used hollow fiber membrane cartridges and hollow fiber membranes thereof in a batch mode, the manufacturing time and cost may be reduced via simplified potting.

MODE FOR INVENTION

Hereinafter, the embodiments of the present invention will be described in detail with reference to the accompanying drawings so as to allow those skilled in the art to easily implement the present invention. However, the present invention may be modified in various ways and is not limited to the embodiments described herein.

Figure 1:
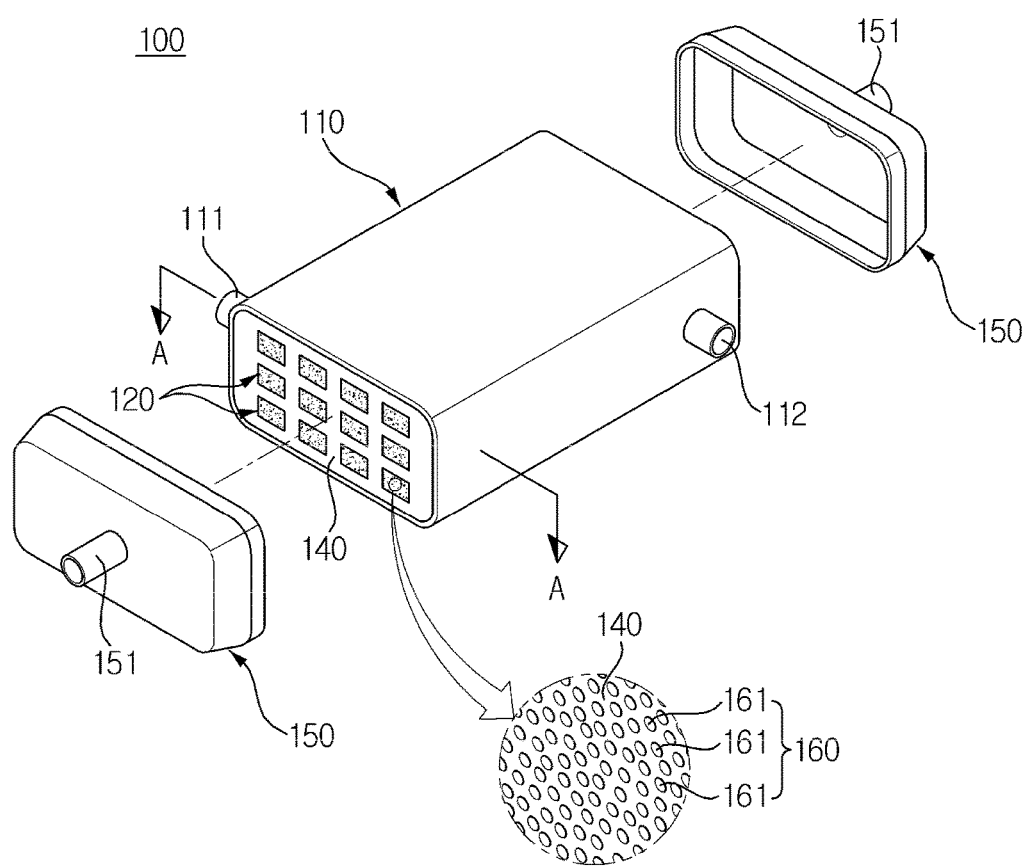
FIG. 1 is an exploded perspective view of a portion of a hollow fiber membrane cartridge-type humidification module according to a first embodiment of the present invention.
Figure 2:
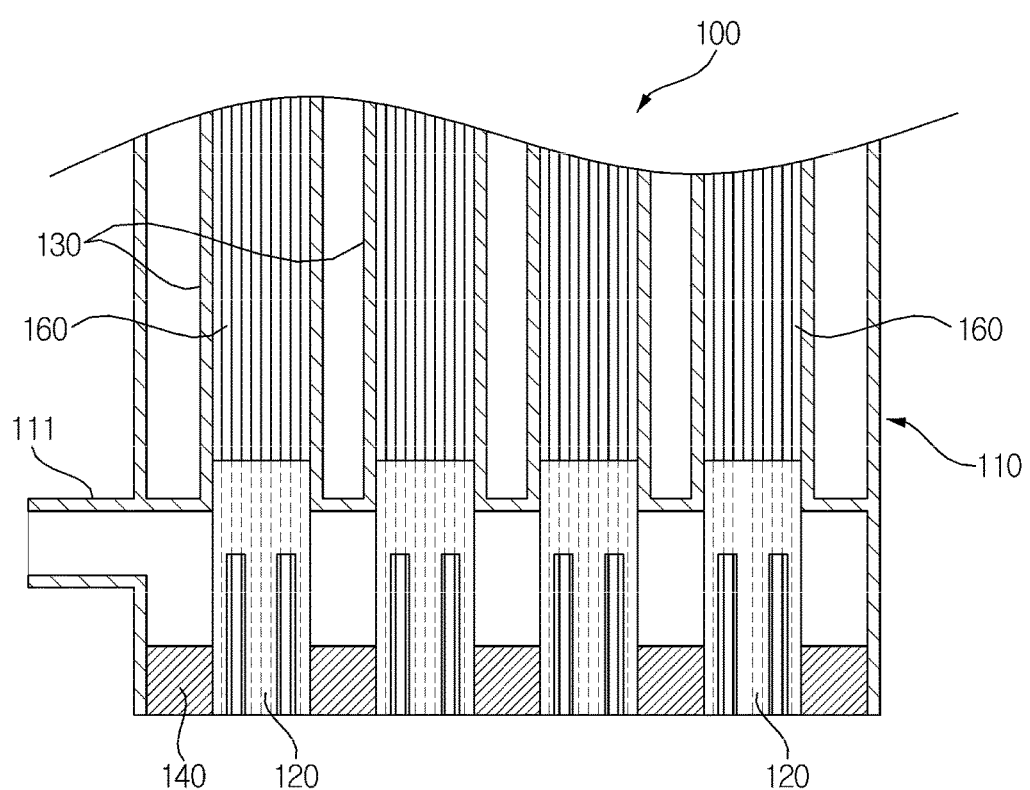
FIG. 2 is a cross-sectional view (longitudinal cross-sectional view) taken along arrows A-A in FIG. 1.
Figure 3:
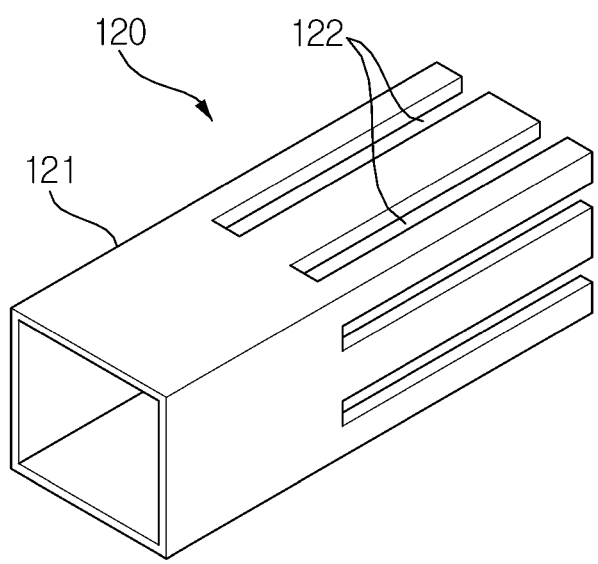
FIG. 3 is a perspective view illustrating a commonly used hollow fiber membrane cartridge of FIG. 2.

FIG. 1 is an exploded perspective view of a portion of a hollow fiber membrane cartridge-type humidification module according to a first embodiment of the present invention, FIG. 2 is a cross-sectional view (longitudinal cross-sectional view) taken along arrows A-A in FIG. 1, and FIG. 3 is a perspective view illustrating a commonly used hollow fiber membrane cartridge of FIG. 2. As illustrated, the hollow fiber membrane cartridge-type humidification module 100 according to the first embodiment includes a housing 110, commonly used hollow fiber membrane cartridges 200, a sectioning unit 130, potting portions 140, and covers 150.

Figure 6:
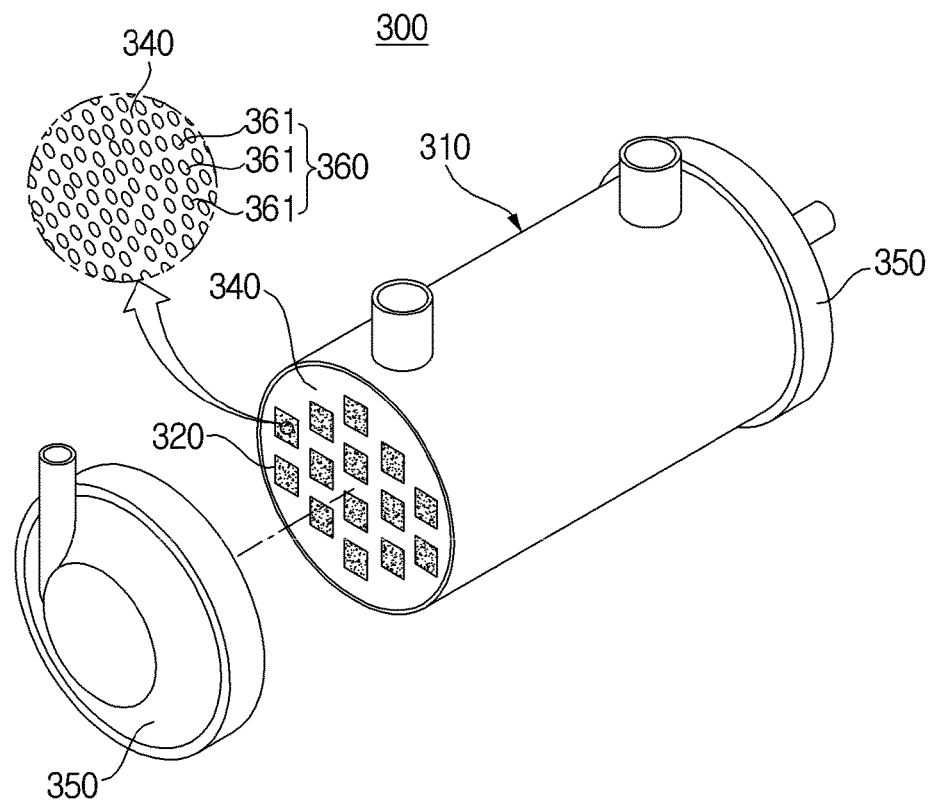
FIG. 6 is an exploded perspective view illustrating a portion of a hollow fiber membrane cartridge-type humidification module according to a third embodiment of the present invention.

The housing 110 and the covers 150 may define the external appearance of the humidification module 100, and may be formed of a hard plastic, such as for example polycarbonate, or a metal. In addition, the housing 110 and the covers 150 may have a polygonal cross-sectional shape in the width direction, as illustrated in FIG. 1, or may have a circular cross-sectional shape, as illustrated in FIG. 6. The polygonal shape may be, for example, a rectangular shape, a square shape, a trapezoidal shape, a parallelogram shape, a pentagonal shape, or a hexagonal shape, and may have rounded corners. In addition, the circular shape may be an oval shape.

The housing 110 is provided at one end thereof with an introduction port 111, into which a humidification fluid is supplied, and is also provided at the other end thereof with a discharge port 112, from which the humidification fluid that has been used to humidify the inside is discharged. The covers 115 are assembled to both ends of the housing 110.

The commonly used hollow fiber membrane cartridges 120 are fitted into opposite ends of a plurality of hollow fiber membrane bundles 160, which are inserted into the housing 110 in the longitudinal direction of the housing. Each of the commonly used hollow fiber membrane cartridges 120 has a structure in which a plurality of fluid passages 122 are formed in the outer surface of one end of a body 121 having open opposite sides, and allows the fluid to be easily introduced into the space between hollow fiber membranes 161 of the hollow fiber membrane bundle 160 through the fluid passages 122. In addition, the hollow fiber membrane cartridge is assembled so that some of the fluid passages 122 are located toward the potting portion 140, which enables easy potting of the commonly used hollow fiber membrane cartridge 120.

Although the commonly used hollow fiber membrane cartridge 120 has a rectangular transverse cross-sectional shape in the present embodiment, it may have a circular shape, an oval shape, or any other polygonal shape, and may have rounded corners when it has a polygonal shape. The ratio of the equivalent diameter to the length of the hollow fiber membrane bundle inside the commonly used hollow fiber membrane cartridge may range from 1:2 to 1:10. The equivalent diameter is the diameter that is required to change, for example, the surface area of a polygon that is brought into contact with a fluid into a circular shape having the same size. The equivalent diameter is used to calculate a flow friction, flow-rate or heat transfer based on a circular pipe. The equivalent diameter may be calculated via a known method according to a polygonal shape or various other shapes.

The sectioning unit 130 is provided inside the housing 110 and sections the hollow fiber membrane bundles 160. The sectioning unit 130 may be integrally formed with the housing 110, or may be separately formed and assembled with the housing 110. The hollow fiber membrane bundles 160 are inserted into respective insertion spaces inside the sectioning unit 130.

The potting portions 140 fill voids between the hollow fiber membranes 161 while binding the hollow fiber membranes 161 of the hollow fiber membrane bundles 160 in the ends (the fluid passage side) of the commonly used hollow fiber membrane cartridges 120, and are also brought into contact with the inner surfaces of both ends of the housing 110 so as to hermetically seal the housing 110. The material of the potting portions 140 is known, and thus a detailed description thereof will be omitted herein.

The potting portions 140 are formed inside the respective ends of the housing 110 so that the hollow fiber membrane bundles 160 inside the hollow fiber membrane cartridges 120 are fixed at both ends thereof to the housing 110. Thereby, both ends of the housing 110 are clogged by the potting portions 140 so that a flow path for passage of a humidification fluid is formed inside the housing. In the present invention, the commonly used hollow fiber membrane cartridges 120 and the hollow fiber membrane bundles 160 are subjected to potting in the housing 110 in a batch mode.

The covers 150 are coupled to the respective ends of the housing 110. Each cover 150 is provided with a fluid inlet/outlet hole 151. A hydraulic fluid that is introduced into the fluid inlet/outlet hole 151 of one cover 150 is humidified while passing through the inner paths of the hollow fiber membranes 161 of the hollow fiber membrane bundles 160, and is discharged from the fluid inlet/outlet hole 151 of the other cover 150.

The multiple hollow fiber membrane bundles 160 are inserted into and arranged in the insertion spaces inside the sectioning unit 130 according to the capacity of the humidification module 100. The hollow fiber membranes 161 of the hollow fiber membrane bundles 160 selectively permeate moisture. The material of the hollow fiber membranes 161 is known, and thus a detailed description thereof will be omitted herein. The hollow fiber membrane bundle 160 may include the hollow fiber membranes 161 within a range from 30 vol % to 60 vol % of the entire volume thereof.

Figure 4:
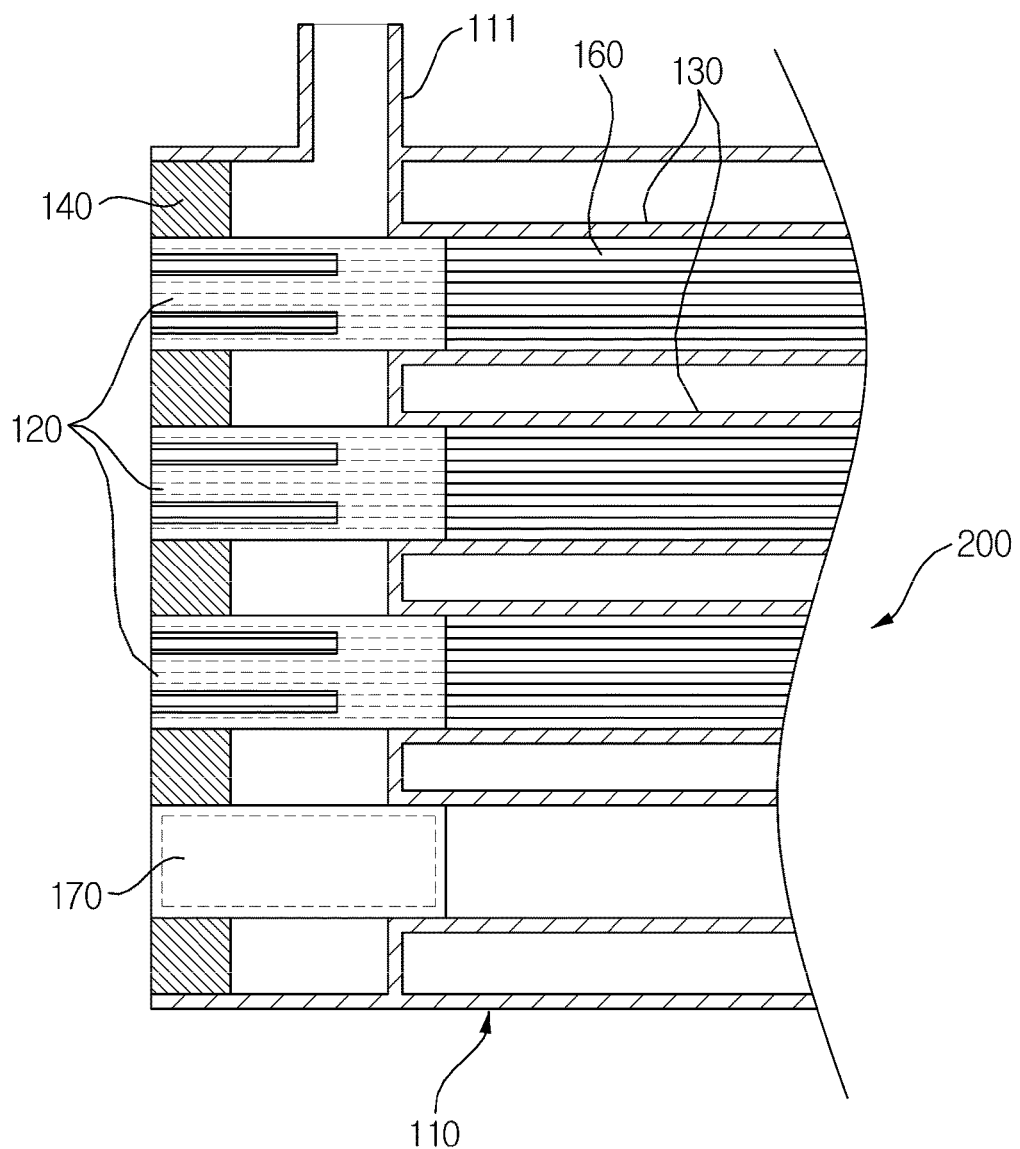
FIG. 4 is a cross-sectional view (longitudinal cross-sectional view) illustrating a hollow fiber membrane cartridge-type humidification module according to a second embodiment of the present invention.
Figure 5:
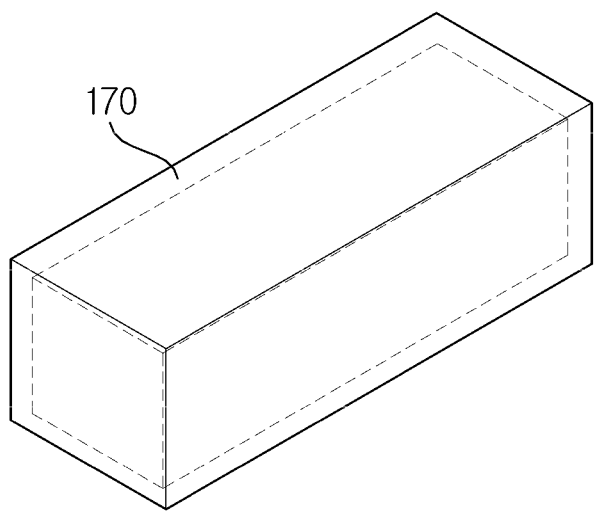
FIG. 5 is a perspective view illustrating a commonly used empty cartridge of FIG. 4.

FIG. 4 is a cross-sectional view (longitudinal cross-sectional view) illustrating a hollow fiber membrane cartridge-type humidification module 200 according to a second embodiment of the present invention, and FIG. 5 is a perspective view illustrating a commonly used empty cartridge of FIG. 4. As illustrated, commonly used empty cartridges 170 may be additionally provided inside the housing 110 so as to be fitted into the sectioning unit 130 with no hollow fiber membrane bundle and undergo potting into the housing in a batch mode according to the humidification capacity or humidification capability of the humidification module.

The commonly used empty cartridge 170 has a circular shape, an oval shape or a polygonal shape, and is closed to prevent a fluid from moving into the insertion spaces inside the sectioning unit 130. The commonly used empty cartridge 170 of the second embodiment has the shape of a rectangular vessel that conforms to the insertion space inside the sectioning unit 130. The insertion space inside the sectioning unit 130, into which the commonly used empty cartridge 170 is inserted, is empty. The remainder of the configuration of the second embodiment is identical to the first embodiment, and is designated by the same reference numerals, and a detailed description thereof will be omitted.

FIG. 6 is an exploded perspective view illustrating a portion of a hollow fiber membrane cartridge-type humidification module according to a third embodiment of the present invention. As illustrated, the hollow fiber membrane cartridge-type humidification module 300 according to the third embodiment includes a housing 310, commonly used hollow fiber membrane cartridges 320, a sectioning unit (not illustrated), potting portions 340, covers 350, and hollow fiber membrane bundles 360 formed by binding hollow fiber membranes 361. The hollow fiber membrane cartridge-type humidification module 300 of the third embodiment has a cylindrical shape, and the remainder of the configuration is similar to the first embodiment, and thus a detailed description thereof will be omitted.

Figure 7:
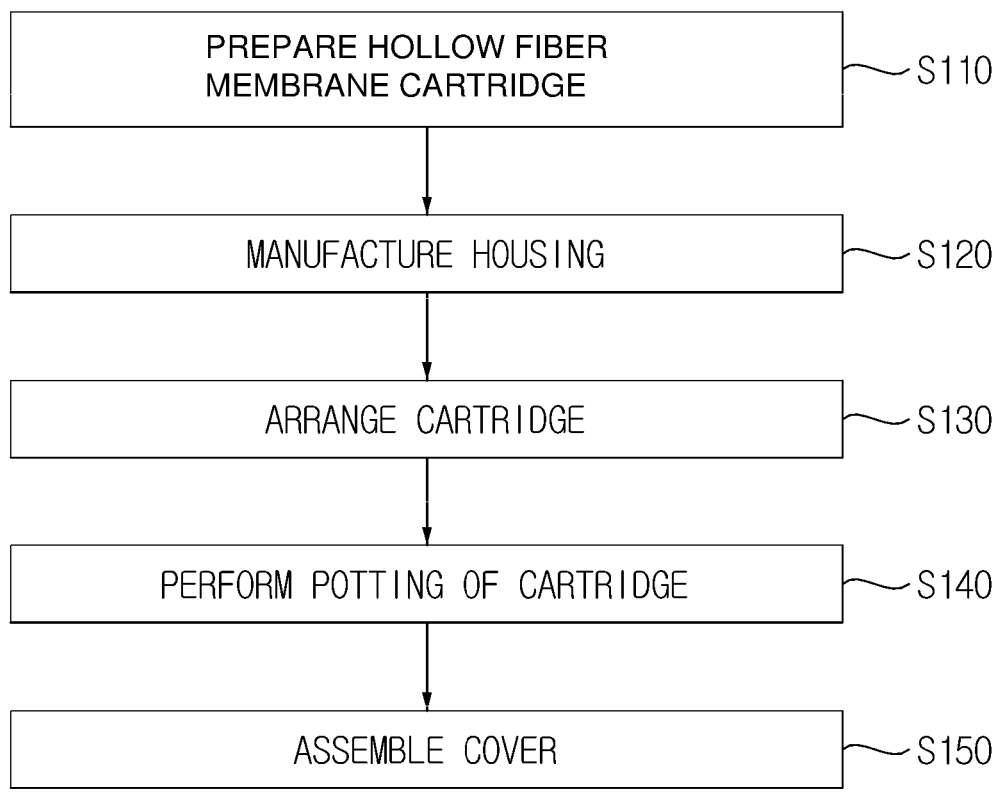
FIG. 7 is a flowchart illustrating a manufacturing process of the hollow fiber membrane cartridge-type humidification module according to the embodiment of the present invention.

The hollow fiber membrane cartridge-type humidification module according to the embodiment of the present invention having the above-described configuration, as illustrated in FIG. 7, is completed via a commonly used hollow fiber membrane cartridge preparation step S110, a housing manufacturing step S120, a cartridge arrangement step S130, a cartridge potting step S140, and a cover assembly step S150.

The commonly used hollow fiber membrane cartridge preparation step S110 is the step of preparing a plurality of commonly used hollow fiber membrane cartridges 120, which are manufactured via a known method such as, for example, injection molding, extrusion molding, or any other type of processing. The housing manufacturing step S120 is the step of manufacturing the housing 110 having the sectioning unit 130, which sections the hollow fiber membrane bundles 160, after determining the capacity of the module according to the shape and number of the commonly used hollow fiber membrane cartridges 120. The cartridge arrangement step S130 is the step of inserting and arranging the commonly used hollow fiber membrane cartridges 120 and the hollow fiber membrane bundles 160 into the sectioning unit 130 inside the housing 110. The cartridge potting step S140 is the step of potting the arranged commonly used hollow fiber membrane cartridges 120 and the arranged hollow fiber membrane bundles 160 into the housing 110 in a batch mode. The cover assembly step S150 is the step of assembling the covers 150 with both ends of the housing 110 in which the commonly used hollow fiber membrane cartridges 120 and the hollow fiber membrane bundles 160 have undergone potting.

The commonly used hollow fiber membrane cartridges 120 and the housing 110 may be manufactured and prepared via a separate process. In the housing manufacturing step S120, the sectioning unit 130 may be integrally manufactured with the housing 110. In addition, in the housing manufacturing step S120, the sectioning unit 130 may be separately manufactured and then assembled with the housing 110.

With the method for manufacturing hollow fiber membrane cartridge-type humidification module described above, the commonly used hollow fiber membrane cartridges are inserted into and integrated with the housing, whereby the housing may be manufactured according to the shape and number of commonly used hollow fiber membrane cartridges, which enables the realization of products having a greater variety of capacities, and may increase the efficiency of use of the commonly used hollow fiber membrane cartridges according to the shape and number thereof and the size ratio thereof. In addition, by potting the commonly used hollow fiber membrane cartridges and hollow fiber membranes thereof in a batch mode, the manufacturing time and cost may be reduced via simplified potting.

Hereinafter, the configuration and effects of the present invention will be described in more detail via examples in which the humidification modules were manufactured according to the embodiment of the present invention, comparative examples, and an experimental example. These examples are given to exemplify the present invention, and the following description is not limited by the examples.

Example: Manufacture of Humidification Module

Comparative Example 1

After 12 cartridges, acquired by dividing 4200 polysulfone hollow fiber membranes (having an outer diameter of 900 μm and an inner diameter of 800 μm) into 12 bundles (each having 350 hollow fiber membranes), were each potted, the 12 potted cartridges were placed inside a polygonal housing (having a width of 250 mm, a height of 150 mm and a length of 300 mm), and both ends of the housing were potted. Thereafter, when the ends of the housing were covered with covers, a humidification module was manufactured.

Comparative Example 2

Figure 8:
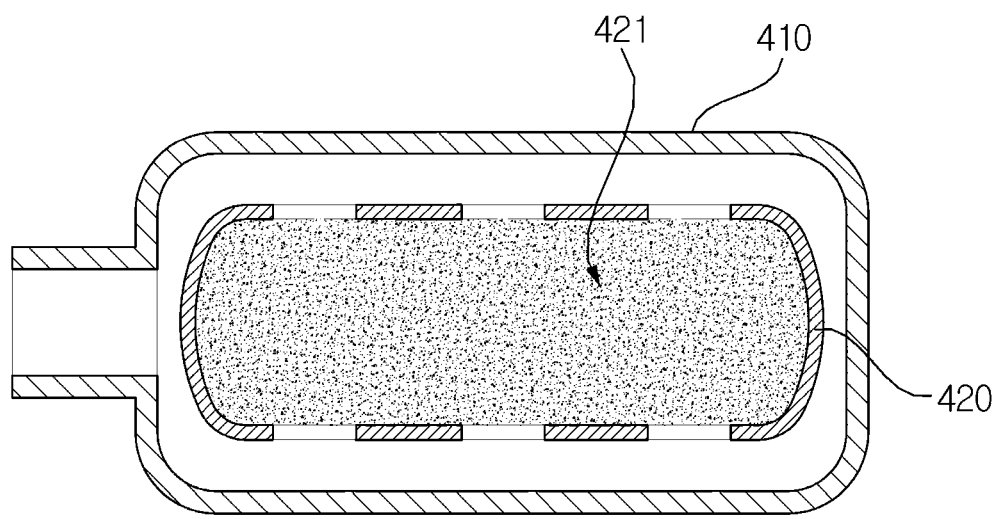
FIG. 8 is a transverse cross-sectional view of a conventional hollow fiber membrane module.

As illustrated in FIG. 8, a bundle 421 of 6000 polysulfone hollow fiber membranes (having an outer diameter of 900 μm and an inner diameter of 800 μm) was placed to form a single module 420 inside a polygonal housing 410 (having a width of 250 mm, a height of 150 mm, and a length of 300 mm).

Both ends of the housing were covered with caps that are used to form potting portions, and a potting composite was injected into and cured in the space in the hollow fiber membrane bundle and the space between the hollow fiber membrane bundle and the housing so as to form a seal. After the caps that are used to form potting portions were removed, ends of the cured hollow fiber membrane potting composite were cut so that ends of the hollow fiber membrane bundle are revealed from the cut portions so as to form potting portions. Thereafter, when both ends of the housing were covered with covers, a humidification module was manufactured.

Example 1

4800 polysulfone hollow fiber membranes (having an outer diameter of 900 μm and an inner diameter of 800 μm) were divided into 12 bundles (each having 400 polysulfone hollow fiber membranes), and commonly used hollow fiber membrane cartridges were inserted into both ends of the respective bundles. Then, the cartridges were inserted into and placed in insertion spaces of a sectioning unit provided inside a polygonal housing (having a width of 250 mm, a height of 150 mm and a length of 300 mm) (See FIG. 1).

Both ends of the housing were covered with caps that are used to form potting portions, and a potting composite was injected into and cured in the space between the hollow fiber membrane bundles and the space between the hollow fiber membrane bundles and the housing so as to form a seal. After the caps that are used to form potting portions were removed, ends of the cured hollow fiber membrane potting composite were cut so that ends of the hollow fiber membrane bundles are revealed from the cut portions so as to form potting portions. Thereafter, when both ends of the housing were covered with covers, a humidification module was manufactured.

Example 2

4200 polysulfone hollow fiber membranes (having an outer diameter of 900 μm and an inner diameter of 800 μm) were divided into 12 bundles (each having 350 polysulfone hollow fiber membranes), and commonly used hollow fiber membrane cartridges were inserted into both ends of the respective bundles. Then, the cartridges were inserted into and placed in insertion spaces of a sectioning unit provided inside a polygonal housing (having a width of 250 mm, a height of 150 mm and a length of 300 mm) (See FIG. 1).

Both ends of the housing were covered with caps that are used to form potting portions, and a potting composite was injected into and cured in the space between the hollow fiber membrane bundles and the space between the hollow fiber membrane bundles and the housing so as to form a seal. After the caps that are used to form potting portions were removed, ends of the cured hollow fiber membrane potting composite were cut so that ends of the hollow fiber membrane bundles are revealed from the cut portions so as to form potting portions. Thereafter, when both ends of the housing were covered with covers, a humidification module was manufactured.

Experimental Example: Measurement of Performance of Manufactured Humidification Module Dry air was introduced at a flow rate of 50 g/sec to the inside and the outside of the hollow fiber membranes of the humidification modules manufactured in the examples and the comparative examples. Then, in the state in which the outside of the hollow fiber membranes was kept at a temperature of 70° C. and a humidity of 90%, and the inside of the hollow fiber membranes was kept at a temperature of 40° C. and a humidity of 10%, gas-gas humidification was performed.

The humidification performance was measured by measuring the temperature and humidity of the humidified air moving through the hollow fiber membranes at the outlet at which the humidified air is discharged and converting the measured values into a dew point, and the results thereof were illustrated in Table 1 in conjunction with the number of potting times.

TABLE 1

| Classification | Comparative Example 1 | Comparative Example 2 | Example 1 | Example 2 |
|---|---|---|---|---|
| Number of humidification membranes | 4200 | 6000 | 4800 | 4200 |
| Humidification performance (outlet dew point) | 52 | 43 | 52 | 54 |
| Number of manufacture times of modules (number of potting times) | 12 | 1 | 1 | 1 |

Referring to FIG. 1, it can be found that the humidification modules manufactured in Example 1 and Example 2 have a reduced number of potting times and more simplified potting compared to Comparative example 1, and achieve a reduced number of humidification membranes and higher humidification performance compared to Comparative example 2.

Although the embodiment of the present invention has been described above, modifications and variations of the present invention can be made via additions, modifications and omission of constituent elements by those skilled in the art without departing from the gist of the appended claims. Thus, it is intended that the modifications and variations should not be understood independently of the technical sprit or prospect of the disclosure.

The invention claimed is:

1. A hollow fiber membrane cartridge-type humidification module comprising:
    a housing;
    hollow fiber membrane cartridges fitted to both ends of a plurality of hollow fiber membrane bundles, which are inserted into the housing in a longitudinal direction of the housing;
    a sectioning unit provided inside the housing so as to section the hollow fiber membrane bundles; and
    a potting portion configured to fix the hollow fiber membrane cartridges and the hollow fiber membrane bundles into the housing in a batch mode,
    wherein the sectioning unit is integrally formed with the housing, or is separately formed and assembled with the housing, and
    wherein the hollow fiber membrane bundles and one end of the hollow fiber membrane cartridges are inserted into respective insertion spaces inside the sectioning unit.

2. The module according to claim 1, further comprising empty cartridges provided inside the housing so as to be fitted into the sectioning unit with no hollow fiber membrane bundle and undergo potting into the housing in a batch mode according to a humidification capacity or humidification capability of the humidification module.

3. The module according to claim 1, wherein each hollow fiber membrane cartridge has a plurality of fluid passages formed the outer surface of one end of a body having open opposite sides to allow a fluid to be easily introduced into the hollow fiber membrane bundle.

4. The module according to claim 1, wherein the hollow fiber membrane bundle in each hollow fiber membrane cartridge includes hollow fiber membranes within a range from 30 vol % to 60 vol % of an entire volume thereof.

5. The module according to claim 1, wherein the housing has a circular, oval, or polygonal transverse cross-sectional shape.

6. The module according to claim 1, wherein each hollow fiber membrane cartridge has a circular, oval, or polygonal transverse cross-sectional shape.

7. The module according to claim 6, wherein the hollow fiber membrane bundle in the hollow fiber membrane cartridge has a ratio of an equivalent diameter to a length thereof within a range from 1:2 to 1:10.

8. The module according to claim 2, wherein the empty cartridges have a circular, oval or polygonal shape and are closed to prevent a fluid from moving into an insertion space in the sectioning unit.

9. A method of manufacturing a hollow fiber membrane cartridge-type humidification module, the method comprising:
    preparing hollow fiber membrane cartridges to be fitted to both ends of hollow fiber membrane bundles;
    manufacturing a housing having a sectioning unit configured to section the hollow fiber membrane bundles after determining a capacity of the module according to the shape and number of the hollow fiber membrane cartridges;
    inserting and arranging the hollow fiber membrane cartridges and the hollow fiber membrane bundles into the housing; and
    potting the arranged hollow fiber membrane cartridges and the arranged hollow fiber membrane bundles into the housing in a batch mode,
    wherein, in the manufacturing, the sectioning unit is integrally formed with the housing, or is separately formed and assembled with the housing, and
    wherein, in the inserting and arranging, the hollow fiber membrane bundles and one end sectioning unit.

10. The method according to claim 9, wherein, in the inserting and arranging, an empty cartridge having closed ends is fitted into the sectioning unit with no hollow fiber membrane bundle and undergoes potting into the housing in a batch mode.

* * * * *